Dec. 1, 1953     W. E. SWENSON     2,660,900
TRANSMISSION
Filed Aug. 17, 1950     7 Sheets-Sheet 1

INVENTOR.
WILLIAM E. SWENSON
BY
Carlsen + Hagle
Attorneys

Dec. 1, 1953
W. E. SWENSON
2,660,900
TRANSMISSION
Filed Aug. 17, 1950
7 Sheets-Sheet 3
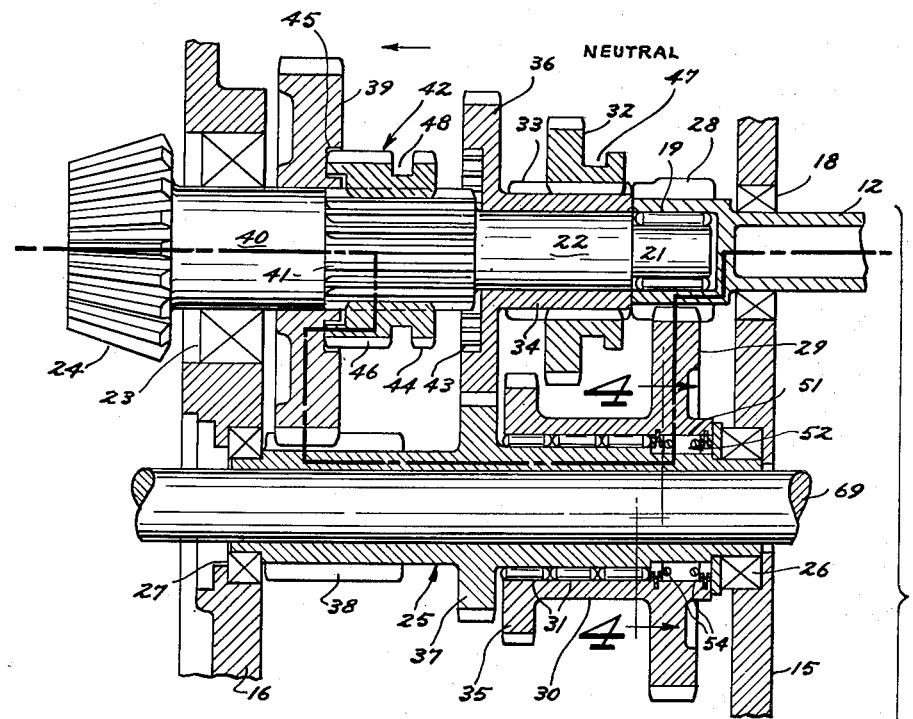
FIG 3
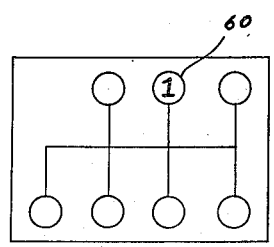
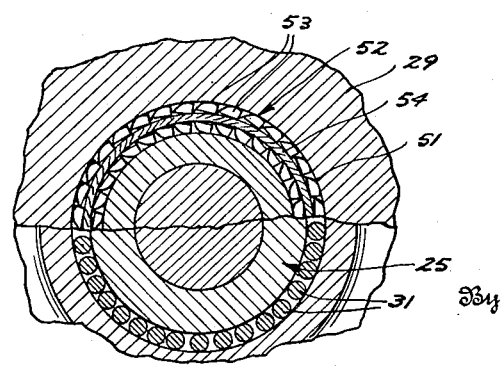
FIG 4
Inventor
WILLIAM E. SWENSON
By Carlsen + Hagle
Attorneys Dec. 1, 1953  W. E. SWENSON  2,660,900
TRANSMISSION
Filed Aug. 17, 1950  7 Sheets-Sheet 4

FIG 5

NEUTRAL

FIG 6

Inventor
WILLIAM E. SWENSON
By Carlsen + Hoyle
Attorneys

Dec. 1, 1953   W. E. SWENSON   2,660,900
TRANSMISSION
Filed Aug. 17, 1950   7 Sheets-Sheet 5
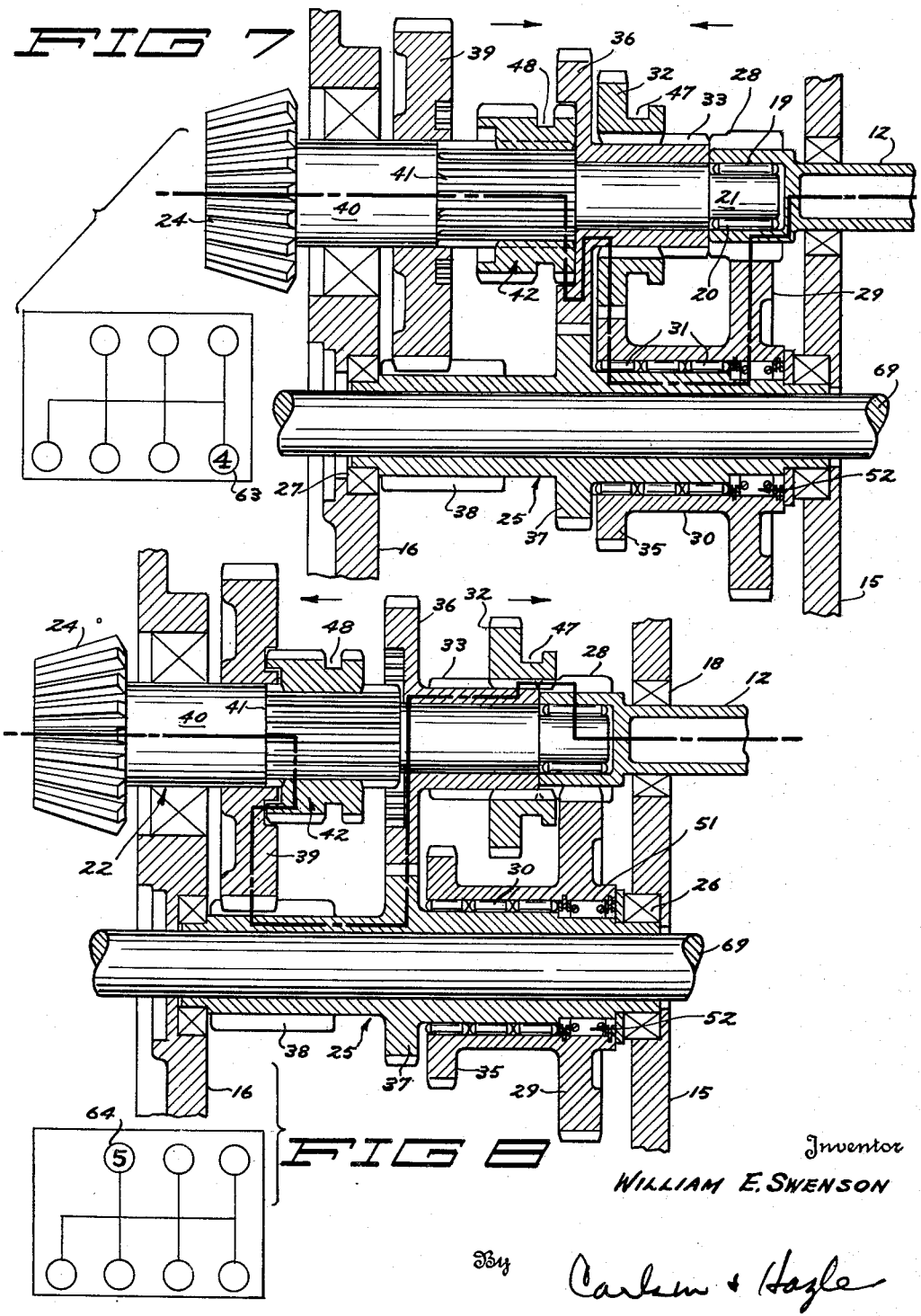
Inventor
WILLIAM E. SWENSON
By Carlsen & Hagle
Attorneys

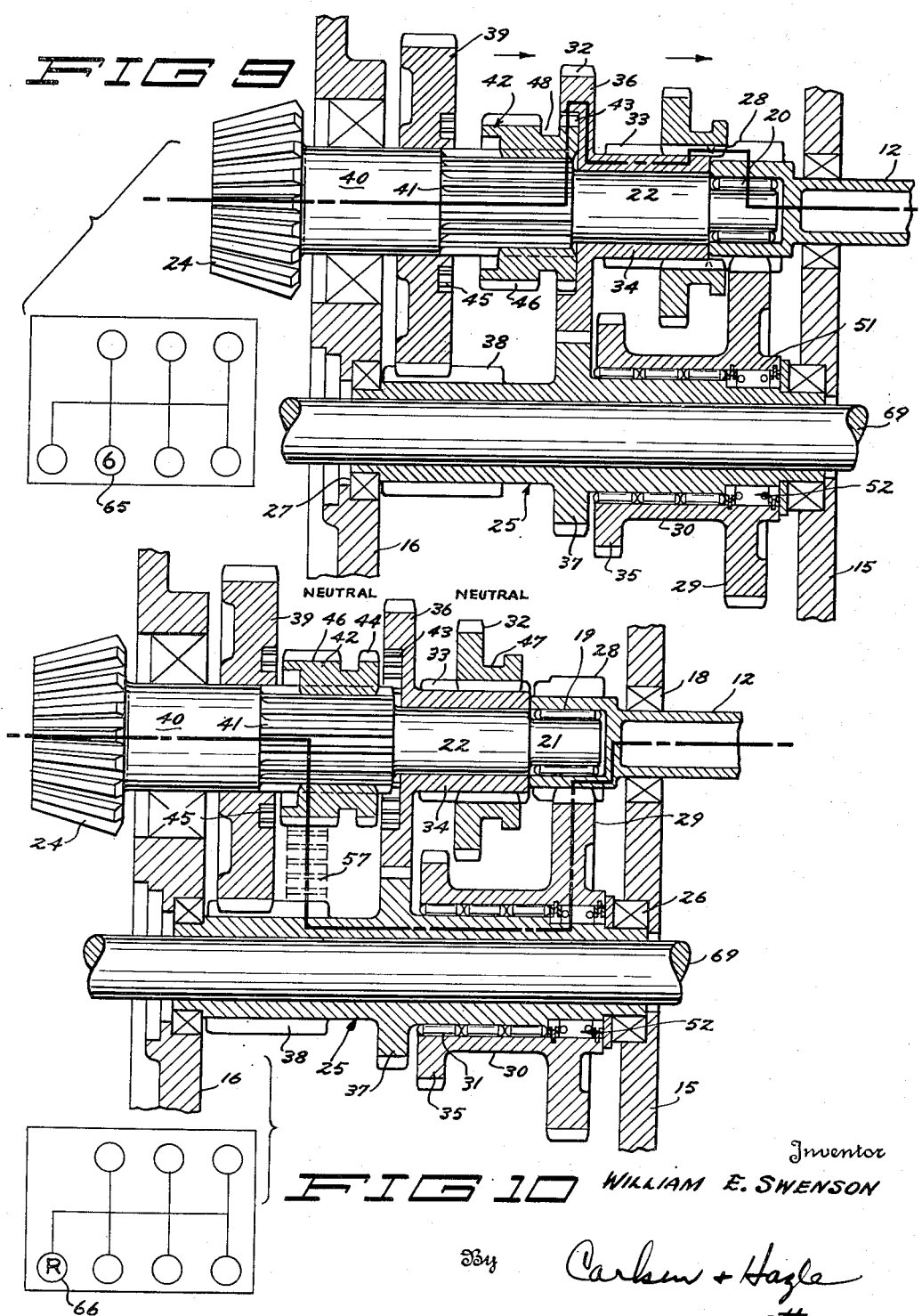

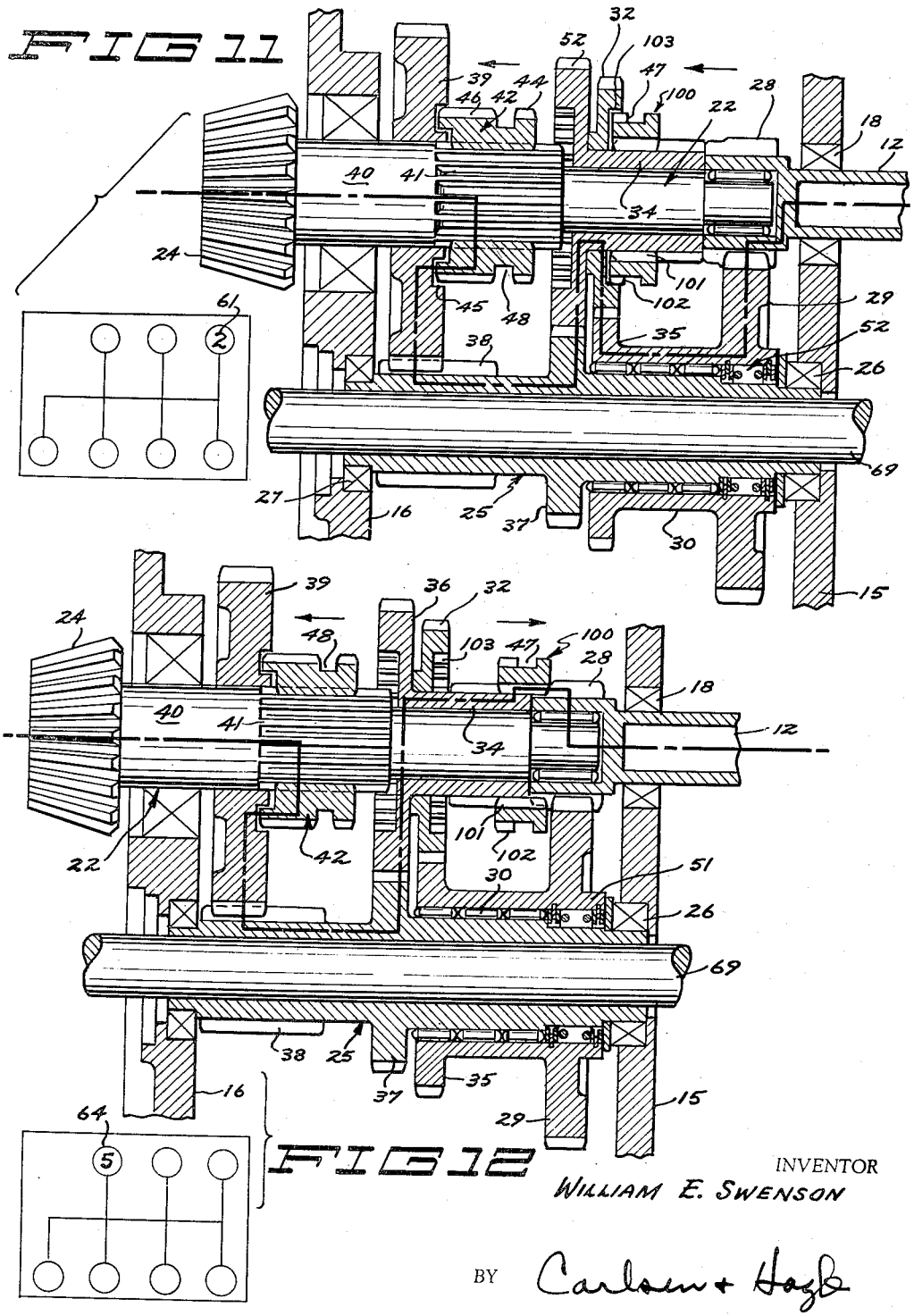

Patented Dec. 1, 1953

2,660,900

UNITED STATES PATENT OFFICE 2,660,900

TRANSMISSION

William E. Swenson, St. Paul, Minn., assignor to Minneapolis-Moline Company, Hopkins, Minn., a corporation of Minnesota Application August 17, 1950, Serial No. 179,999

13 Claims. (Cl. 74—375)

This invention relates to improvements in change speed transmissions for motor vehicles, particularly tractors.

The present trend toward full mechanization of farm work requires that the tractor used for operating various pieces of farm equipment have a wide choice of forward speeds in order to do its work satisfactorily, and this has introduced a problem in design of the transmission which my invention has as its chief object to solve. In the ordinary type of transmission each set of gears operates the output or driven shaft at a certain speed and for added speeds more gears are needed with the result that a transmission thus built for the number of forward speeds needed by the modern tractor becomes very unwieldly and expensive in construction, and changing speeds require the shifting of heavy gear clusters. In addition the shifting pattern becomes confused or so complex as to make it difficult if not actually dangerous for all but the most skilled and careful person to operate. In accordance with the primary object of my invention I provide a transmission which will offer the requisite variety of speeds, which is simple and compact, and easy to shift with a quite simple and safe shifting pattern.

A further object is to provide a transmission wherein, as an example, six forward speeds may be obtained with but four gear pairs, thus in effect "stealing" two extra speeds for a normal gear complement, with a resulting saving in complexity, weight and size of the transmission.

Another object of the invention is to provide a transmission wherein the change speed gears remain all but one constantly in mesh, with an overrunning clutch arranged to permit this feature, and wherein the speed changes are effected by light, easily shiftable shuttles or shuttle gears instead of by moving the larger and heavier gear clusters as in the usual thing.

Still a further object of my invention is to provide a six forward speed transmission with four pairs of constant mesh change speed gears and two shiftable clutches or shuttles, one of which selects three speed ranges and the other of which then selects a high or low speed for each such selected range, thus offering six possible speeds. In addition this transmission, as well as a modification wherein one of the change speed gears is a part of one of the shiftable clutches permits the use of a simple and safe shifting pattern wherein shifting from any speed to another always requires going through an intermediate neutral condition, as contrasted to a multiple speed shifting pattern wherein a shift from one speed to another requires going through an intermediate speed before reaching neutral. It is easy for an operator to become confused in the latter case and, thinking his machine is in neutral, release the clutch and cause an accident and this tendency is increased where more than three or four speeds are possible.

Still another object of the invention is to provide a transmission including an extremely simple reverse gear arrangement.

A further object of the invention is to provide an improved transmission wherein the tractor power take-off shaft is extended through one line of the change speed gears and driven from the tractor engine ahead of the transmission.

These and other more detailed and specific objects will be disclosed in the course of the following specification, reference being had to the accompanying drawing, in which:

Fig. 3 is a sectional and somewhat schematic view through the operating elements of the transmission itself, showing the parts in the position taken when the transmission is adjusted for a first or low speed, and included with such view is a diagram of a shifting pattern which may be followed in making the change speed adjustments of the transmission.

Fig. 4 is an enlarged fragmentary vertical section along the line 4—4 in Fig. 3 and showing particularly the overrunning clutch with which one of the gear clusters of the transmission is equipped.

Figure 1:
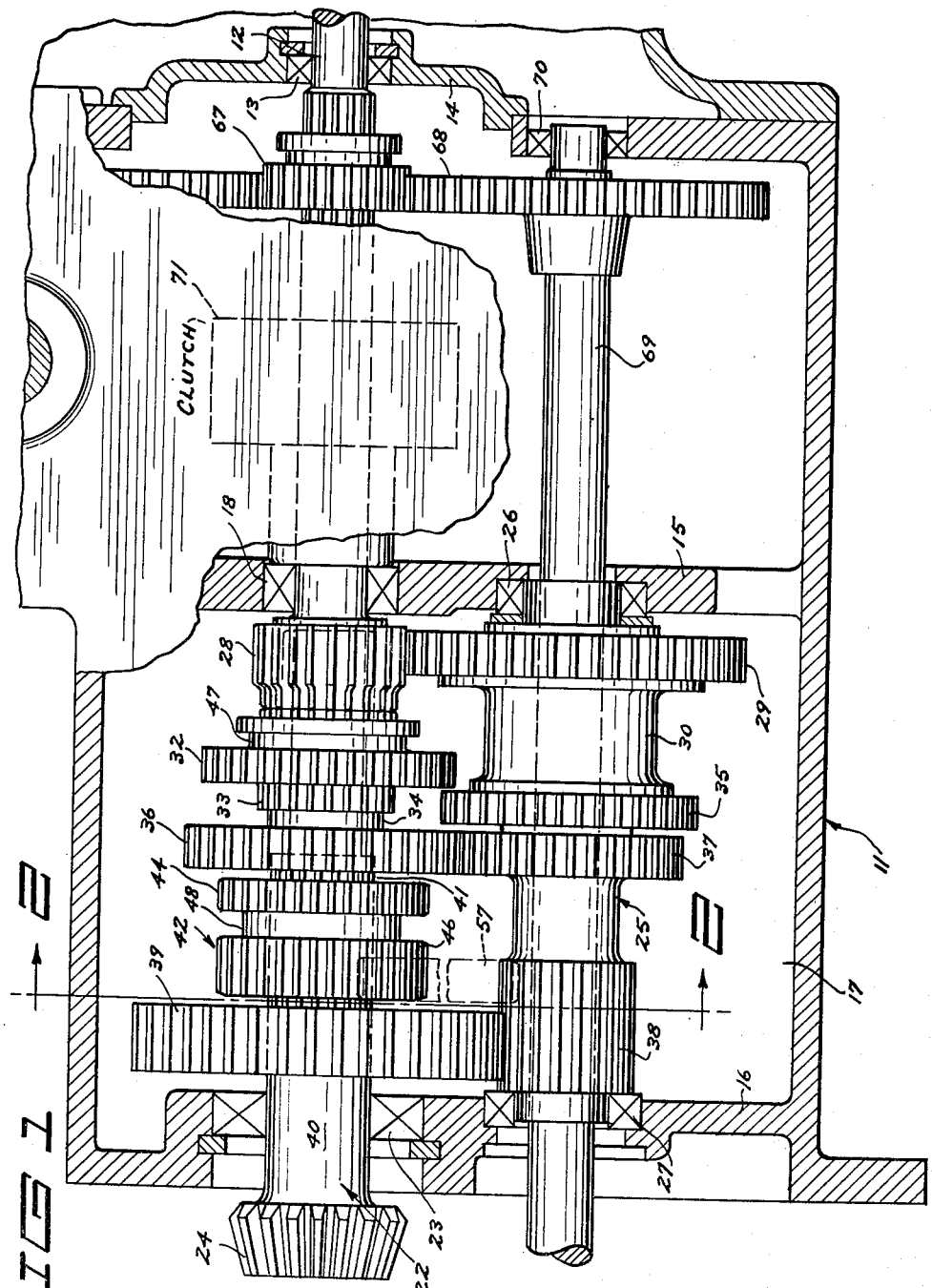
Fig. 1 is a longitudinal sectional view through a transmission according to my invention with the gears thereof shown in elevation and with a forward portion of the transmission casing broken away to disclose the manner in which the power take-off shaft is driven in advance of the transmission itself.

Figs. 5 through 10 are sectional and schematic views, with accompanying shifting pattern diagrams, similar to Fig. 3 but illustrating the position assumed by the transmission parts when it is adjusted to second, third, fourth, fifth, and sixth forward speeds and a single reverse speed. These views in common with Fig. 3 also indicate by heavy dot-dash lines the paths along which torque is transmitted at the various transmission speeds.

Fig. 11 is a view similar to Fig. 5 but showing a modification of my invention wherein the change speed gears are all in constant mesh and two shiftable clutches or shuttles effect the speed selection.

Fig. 12 is a view similar to Fig. 8 but showing this same constant mesh modification of my invention.

Referring now more particularly and by reference characters to the drawing my improved transmission, in the embodiment here chosen for illustration, comprises a casing or housing designated generally at 11 into the forward end of which there is journaled a shaft 12 to which the tractor or other vehicle engine (not shown) is connected. This shaft 12 is journaled at 13 in a forward end member 14 forming part of the housing, and some distance rearwardly thereof the housing has a partition wall 15 spaced rearwardly from which is a rear end wall 16 thus forming a rearwardly disposed space 17 for the transmission parts. For present purposes the shaft 12 will be considered as the driving or input shaft for the transmission and it extends rearwardly through a bearing 18 in the partition wall 15 into the transmission space 17 for a short distance. This rear end of the drive shaft is bored out as designated at 19 for the accommodation of a needle roller bearing 20 and journaled or piloted into this bearing is the reduced forward end 21 of a driven or output shaft designated generally at 22. This driven shaft 22 at its rear end is journaled through a bearing in the rear end wall 16 of the housing. Formed upon this rearwardly projecting driven end of the shaft is a beveled gear 24 which may be connected to drive the differential (not shown) of the vehicle in the conventional fashion as will be readily understood.

A tubular or hollow countershaft designated generally at 25 is located below the axially aligned driving and driven shafts 12 and 22, with respective forward and rearward ends of the countershaft journaled in bearings 26 and 27 provided for this purpose in the partition wall 15 and rear end wall 16 of the housing. The purpose of using a hollow countershaft at the point will be presently described, but it is immaterial to the understanding of the operation of the transmission per se.

The three shafts 12, 22, and 25 thus arranged carry four sets of change speed gears, or a total of eight in all. The first gear is designated at 28 and takes the form of a comparatively small pinion either formed directly upon the rear end of the driving shaft or secured thereto and, however made, meshing continuously with a second gear indicated at 29. The latter is formed as a part of a countershaft gear cluster having a tubular hub 30 journaled by needle bearings 31 upon the countershaft over the forward portion thereof. The third gear is designated at 32, is slidably splined as indicated at 33 upon a hollow hub 34 forming part of the fifth gear later to be described, and acts as a part of a first speed selector clutch or shuttle as will presently appear. This third gear 32 is shiftable axially along the hub 34 and the splines 33 are so shaped as to actually form elongated gear teeth having the same pitch diameter as the rear portion of the first gear 28, which projects rearwardly with respect to the rear face of gear 29. Thus by shifting the gear 32 in a forward direction to bring its interior splines or teeth into dental engagement with the rear end portion of gear 28 there will be established a positive driving connection between the shafts 12 and 22 such as to cause them to operate as a unit. Opposite rearward shifting of the gear 32 will break this drive connection between shafts 12—22 and will bring the gear into meshing engagement with a fourth gear 35 formed upon the rear end of the hub 30 and completing the forward countershaft gear cluster. The fifth gear of the transmission is designated at 36 and is formed as an integral part of the hub 34 aforesaid whereon the gear 32 is splined as best shown in the various sectional and schematic views in the drawings. This fifth gear 36 meshes constantly with a sixth gear 37 formed integrally with or secured upon the countershaft 25 immediately to the rear of the gear cluster. The seventh gear designated at 38 is also formed on, or secured to, the countershaft 25 and meshes constantly with the eighth and final gear 39 which is journaled upon an enlarged rear portion 40 of the driven shaft 22. The gears 37 and 38 constitute a rear countershaft cluster which turn at all times with the countershaft as will be obvious.

Figure 2:
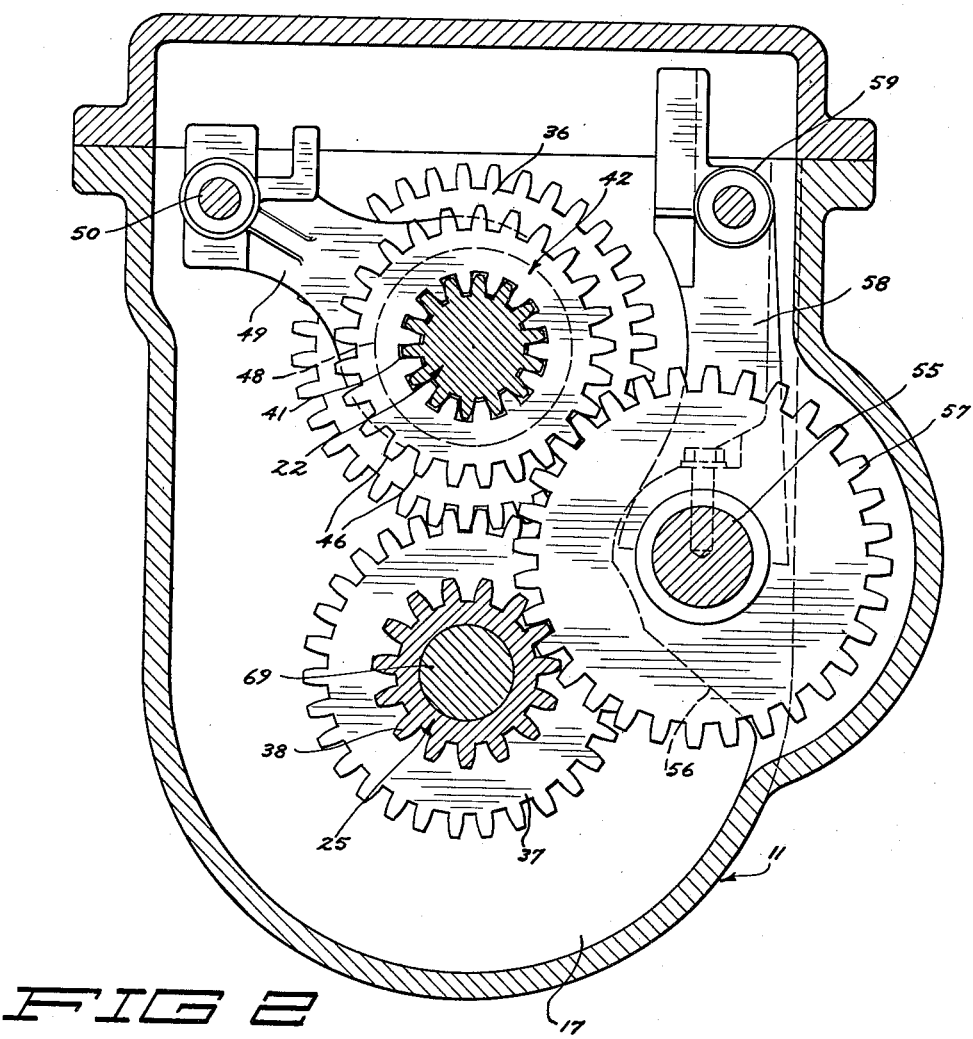
Fig. 2 is a cross sectional view taken substantially along the line 2—2 in Fig. 1.

The enlarged rear end 40 of the driven shaft 22 is longitudinally splined at 41 to slidably accommodate a second shiftable shuttle clutch, designated generally at 42 and located between the gears 36 and 39. The purpose of this shuttle clutch 42 is to selectively lock gears 36 and 39 to the driven shaft 22 and for this purpose the gear 36 is provided with internal teeth 43 which will be dentally engaged by corresponding teeth 44 formed upon the forward end of the shuttle clutch when the latter is shifted in a forward direction. In a similar fashion the gear 39 is provided with internal gear teeth 45 to engage teeth 46 formed around the rear portion of the shuttle clutch 42 when the latter is shifted in the rearward direction. The gear 32 is formed with a peripheral annular groove 47 and the shuttle clutch 42 with a similar groove 48 for the conventional accommodation of shifter or shipper forks, one of which is designated at 49 in Fig. 2 and by means of which forks these parts are shifted between the various desired positions. Also as shown in Fig. 2 the shifter forks have a conventional sliding mounting 50 to which connection is made from the gear shift lever not here shown.

The forward end of the hub 30 is bored out at 51 forming an annular space wherein is mounted a one-way or overrunning clutch mechanism, designated generally at 52, which operates to connect this forward countershaft gear cluster constituted by the gears 29 and 35 and connecting hub 30 to the countershaft 25 in one direction of rotation. However, this overrunning clutch permits the gear cluster and countershaft to operate at different speeds as is required for example in the two speed variations illustrated in Figs. 3 and 5. The clutch mechanism 52 here chosen for illustration is of the type commercially available under the trade name "Formsprag" and comprises a number of sprags 53 which are retained in the space formed by the bore 51 by means of annular coil springs 54. When this gear cluster is driving in one direction the sprags 52 bind between the bore 51 and the countershaft so as to drive the latter but the countershaft may rotate faster and independently of the gear cluster when it is driven by the higher speed gears.

Referring now to Fig. 3 a position of the parts for first or low forward speed and the path of the torque travel through the transmission are shown. For this speed the gear 32 is positioned in a neutral location, as indicated by the legend, whereat it clears both of the gears 28 and 35 thus freeing the connection between the driving and driven shafts 12 and 22. The shuttle clutch 42, however, is shifted rearwardly so that its teeth 46 mesh with the teeth 45 thus connecting the gear 39 to the driven shaft 22. Thus adjusted the gear 28 will rotate the gear 29 and through the overrunning clutch 42 will rotate the countershaft 25 so that in turn the gear 38 will drive the gear 39 and transmit the torque to the driven shaft 22. Inasmuch as the gears 28 and 38 are both smaller than the gears 29 and 39 which they drive there will thus be brought about a maximum speed reduction and the output bevel gear 24 will be driven at its lowest speed relative to that of the driving shaft 12. It is to be noted that, while the gears 36 and 37 remain in mesh, the shuttle clutch 42 being moved rearwardly disconnects the gear 36 from the shaft 22 so that it may rotate idly thereon and not interfere with the path of torque flow through the transmission.

For second speed, or an output speed slightly higher than the lowest just described, the transmission is adjusted to the condition illustrated in Fig. 5 wherein the shuttle clutch 42 remains in its rear position connecting the gear 39 to the driven shaft 22 but the gear 32 is shifted rearwardly to bring it into mesh with the fourth gear 35 as indicated by the arrows above these parts. Now the torque is transmitted from the first gear 28 to the second gear 29 and the fourth gear 35 transmits the rotation to the third gear 32. The latter gear 32 necessarily rotates the fifth gear 36 which constantly meshes with the sixth gear 37 and thus drives the countershaft 25 at a speed proportional to the engine speed and determined by the ratio of the six meshing gears. It is at this point that the overrunning clutch 52 comes into play permitting the countershaft 25 to rotate faster than the gear cluster formed by the gears 29 and 35 without in any way interfering with the transmission of the torque through this gear cluster from the gear 28 to gear 32. Actually this forward gear cluster thus operates at this speed as a second countershaft, rotating freely with respect to countershaft 25. The torque transmission is completed then at this speed by the rotation of the final gear 39 by gear 38, so that the output speed to the bevel gear 24 is slightly higher than that resulting from the adjustments indicated in Fig. 3.

For a third and slightly higher speed the gear 32 is shifted forwardly to a neutral position as indicated by the legend in Fig. 6 while the shuttle clutch 42 is now for the first time shifted forwardly so that its teeth 44 mesh with the internal teeth 43 and connect the fifth gear 36 to rotate with the driven shaft 22. Torque is now transmitted from the gear 28 to the second gear 29 and through the overrunning clutch 52 to the countershaft 25 but in this case the sixth gear 37 upon the countershaft directly drives the driven shaft 22 due to its constant meshing engagement with the fifth gear 36, rotating the output gear 24 at a slightly higher speed. It is to be noted that the aforesaid forward movement of the shuttle clutch 42 has at this point disconnected the final gear 39 from the shaft 22 so that it may turn idly thereon at the comparatively slow speed at which it is driven by its constant meshing engagement with the gear 38 on the countershaft.

The fourth and still higher speed adjustment of the transmission is shown in Fig. 7 whereat the gear 32 is shifted rearwardly to mesh with the gear 35 while the shuttle clutch 42 remains in its forward position connecting the gear 36 to the driven shaft 22, as indicated by the arrows above these parts. Torque is now transmitted from the gear 28 to the gear 29 and from the gear 35 to the gear 32 which being locked to rotate at all times with the gear 36 thus transmits this drive to the driven shaft 22 at a speed higher than the condition shown in Fig. 6. The countershaft 25 idles in this position of the parts, at the speed at which it will be driven by the gear 36 while the overrunning clutch 52 permits the gears 29 and 35 to operate at a different speed. Also, of course, in this position of the parts the final gear 39 idles upon the driven shaft at whatever speed it may be driven by the gear 38 on the countershaft.

A fifth and still higher speed is obtained by the adjustment of the parts to the conditions illustrated in Fig. 8 wherein the gear 32 is shifted forwardly into dental engagement with the gear 28 while the shuttle clutch 42 is again shifted rearwardly to lock the gear 39 to the drive shaft 22, all as indicated by the arrows above the shifting parts. The gear 36 is now locked to the driving shaft 12 through the splines 33 upon the gear hub 34 and the dental engagement of the gear 32 with the gear 28, and the gear 36 thus rotates the countershaft 25 by means of the gear 37 with this drive being then finally transmitted to the gears 38 and 39 and to the output gear 24. The countershaft 25 will rotate freely within the gears 29 and 35, which are slowly and idly driven by the gear 28, due to the action of the overrunning clutch 52.

For a final, highest output speed the transmission is adjusted as shown in Fig. 9 so that there is a direct drive connection established from the driving shaft 12 to the driven shaft 22 independently of any gears within the transmission. As indicated by the arrows above the shifting parts, the gear 32 is shifted forwardly into engagement with the gear 28 while the shuttle clutch 42 is also shifted forwardly to lock the gear 36 to the driven shaft. Thus the torque transmission is through the gear 28 to the hub 34 of the gear 36, and then through the clutch 42 to the driven shaft, while the forward countershaft gear cluster and the countershaft idle at relatively different speeds by action of the overrunning clutch.

The gear 32 and shuttle clutch 42 in effect are first and second shiftable clutches and the first selects any one of three speed ranges, with the transmission in neutral, while the second then places the transmission in gear and selects a high or low speed for each previously selected range. Thus the shuttle clutch 42 "doubles" the three speeds selected by clutch 32 offering the desired six different forward speeds with but four pairs of change speed gears.

As shown in Fig. 2 the transmission includes a reverse countershaft 55 journaled in suitable bearings 56 forming part of the housing 11 so that this shaft parallels the other shafts within the transmission, in a laterally offset plane. A reverse idler gear 57 is slidably mounted upon the countershaft 55 and is located in a transverse plane such that by a rearward movement it may be meshed with the teeth 46 upon the rear portion of the shuttle 42 and with the forward end portions of the teeth forming the seventh gear 38, which are forwardly elongated for this purpose. Such shifting movement of the reverse idler gear 57 is largely conventional and is carried out by means of a shifter fork 58 having a conventional sliding support 59 by which connection is made to the gear shift lever. Referring then to Fig 10, where the adjustment of the transmission for reverse rotation of the output gear 24 and for corresponding reverse movement of the vehicle driven by the transmission is shown, it will be noted that the reverse idler gear 57 is shifted rearwardly from its normal forward position at which it clears the gear 38 into mesh with that gear as shown by the dotted lines 57. At the same time the gear 32 and shuttle 42 are both adjusted to the neutral positions indicated by the legends and torque will now be transmitted from the gear 28 to the gear 29 and through the overrunning clutch 52 to the countershaft 25. This rotation of the countershaft will drive the reverse idler gear 57 by means of the gear 38 and the reverse idler gear will in turn rotate the shuttle 42 but in a direction opposite to that at which it is normally rotated. While the shuttle is in a neutral position clearing both the gears 36 and 39 it nevertheless will drive the output gear 24 through its splined connection 41 to the driven shaft 22 as will be readily understood.

Attention is now called to the shifting patterns illustrated in Figs. 3 and 5 through 10 which illustrate a simple pattern for six forward speeds and one reverse as made possible by my transmission. As an example the gear shift lever diagrammatically illustrated may be positioned at 60 for a first forward speed, 61 for second speed, 62 for third speed, 63 for fourth speed, 64 for fifth speed, 65 for sixth speed, and 66 for reverse. It is the vertical movement of the lever on these diagrams which positions the first clutch or gear 32 and the horizontal movement which positions the second shuttle clutch 42, and attention is called to the fact that in making any speed or direction adjustment the lever moves through an intermediate neutral position. The simplicity and safety of this arrangement will be obvious.

Reverting now to Fig. 1 it will be noted that some distance forwardly of the transmission itself the drive shaft 12 is provided with a pinion 67 which meshes with a gear 68 secured upon the forward end of a shaft 69. This shaft 69 is journaled through the tubular countershaft 25, and at its forward end is supported by bearings 70 in the forward end wall of the transmission housing. The countershaft thus acts as a bearing for the shaft 69 which extends rearwardly from the transmission to constitute the usual power take-off shaft with which tractors are ordinarily provided. In addition to furthering my object of reducing the size of the transmission as a whole, this arrangement and drive to the power take-off shaft 69 lends itself to what is known as a "live power" drive for the tractor power take-off. In other words, by the use of any conventional form of clutch, such as illustrated diagrammatically at 71 in Fig. 1, to selectively apply torque to the input or first gear 28 of the transmission, the power take-off 69 may be constantly driven regardless of the speed of which the transmission drives the tractor or to the total de-clutching of the transmission from the tractor engine. By the provision then further of a simple form of clutch (not shown) upon the rear end of the power take-off shaft, or any other suitable arrangement, an implement or machine driven by the tractor may remain in continuous operation while the tractor itself is brought to a halt as will be readily appreciated. For example, in the case of a combine drawn by the tractor and operated by the power take-off shaft this arrangement will enable the forward motion of the machine to be halted for any reason, while the operating elements in the combine remain in motion thus preventing the slugging of the combine with grain as is frequently the case at present.

While in the previous description the transmission has one change speed gear 32 shiftably mounted, it is possible and may in fact be desirable to construct the transmission as shown in Figs. 11 and 12 with all change speed gears constantly meshed. In these views a great number of the parts are the same as in the earlier described transmission and are accordingly designated throughout by the same reference characters.

However, the gear 32 in this case is loose (but not axially slidable) on the shaft 22 and constantly meshes with the gear 35 while I provide a separate shuttle clutch designated generally at 100 arranged for axial shifting movements upon the splines 33 between gears 28 and 32. This clutch 100 has internal teeth 101 to engage the splines, and the gear 28 when moved into the position of Fig. 12 and at one end has external clutch teeth 102 adapted to mesh with internal teeth 103 formed in the gear 32 in the position of Fig. 11. As before the clutch 100 also has the shifter fork groove 47.

Now in shifting to the second speed position of Fig. 11 the shuttle clutch 100 will be shifted to the left to mesh the clutch teeth 102—103 and thus lock the gear 32 to the hub 34 and the torque transmission conditions will be identical to those shown in Fig. 5, wherein a shift of the gear 32 into mesh with the gear 35 was required. For the fifth speed condition of Fig. 12 the clutch 100 will be shifted to the right meshing its internal teeth 101 with the gear 28 whereupon the drive will be identical to the condition shown in Fig. 8. The gears 32—35, of course, now remain meshed but the gear 32 will idle on the hub 34. Obviously the clutch 100 will be shifted to an intermediate neutral position for first and third forward speeds and reverse, but the illustrations here chosen as to the clutch positions are believed to be adequate for a complete understanding.

It is understood that other suitable modifications may be made in the structure as disclosed, provided such modifications come within the spirit and scope of the appended claims. Having now therefore fully illustrated and described my invention, what I claim to be new and desire to protect by Letters Patent is:

1. In a six forward speed transmission having driving and driven shafts and a countershaft and with change speed gears on the shafts, a first clutch member having means cooperating with clutch means on certain gears and shiftable to positions for selecting any one of three forward speeds, and a second clutch member also having means cooperating with clutch means on certain gears and shiftable from neutral to transmit torque to the driven shaft and select a high or low speed range for any speed selected by the first clutch member.

2. In a six forward speed transmission having driving, driven shafts and countershaft and four change speed gear sets on the shafts, a first shiftable clutch member having means cooperating with clutch means on certain gears operative to select three forward speed ranges, and a second shiftable clutch member also having means cooperating with clutch means on certain gears operative to transmit torque to the driven shaft and select upper and lower speeds for each of the three speed ranges selected by the first clutch member.

3. In a six forward speed transmission of the character described having driving and driven shafts and a countershaft and four constantly meshed change speed gear pairs, a first shuttle clutch member having means cooperating with clutch means on certain gears operative to select any of three forward speed ranges, and a second shuttle clutch member also having means cooperating with clutch means on certain gears operative to establish torque transmission to the driven shaft and select either of two speeds for each speed range selected by the first clutch member.

4. In a transmission, driving and driven shafts, a countershaft, a first gear on the driving shaft, a countershaft gear cluster having two gears and one thereof constantly meshing with the said first gear, a gear on the driven shaft selectively meshing with the other gear of said cluster, an overrunning clutch between the countershaft gear cluster and the countershaft, two pairs of continuously meshing gears on the driven shaft and countershaft, and means for selectively connecting one gear of each said pair to rotate with the driven shaft.

5. In a transmission, coaxial driving and driven shafts, a countershaft, a countershaft gear cluster and overrunning clutch mounting the same on the countershaft, a first gear on the driving shaft, a second gear forming part of the gear cluster and constantly meshed with the first gear, a third gear, a fourth gear also forming part of the gear cluster, a fifth gear loose on the driven shaft and having a splined hub slidably and non-rotatably engaging the third gear, said third gear being shiftable on the hub in and out of dental engagement with the first and fourth gears, sixth and seventh gears rigid with the countershaft and said sixth gear being constantly meshed with said fifth gear, an eighth gear loose on the driven shaft and constantly meshed with the seventh gear, and means for selectively connecting the fifth and eighth gears to rotate with the driven shaft.

6. A transmission of the character described having driving and driven shafts and a countershaft, three pairs of constantly meshed gears on the shafts and a fourth pair of selectively meshed gears, separate shiftable means having clutch teeth cooperating with clutch teeth on certain of the gears for transmitting torque through the transmission at varying output speeds, and an overrunning clutch connecting two gears of the four pairs to the countershaft.

7. In a transmission, coaxial driving and driven shafts, a countershaft, a first gear on the driving shaft, a two gear cluster journaled on the countershaft and having one gear constantly meshing with the first gear on the driving shaft, a third gear on the driven shaft adapted to mesh with the other gear on said cluster, a fifth gear having a hub journaled on the driven shaft and said third gear being loose on the hub, sixth and seventh gears on the countershaft and the sixth gear being constantly meshed with the fifth, an eighth gear journaled on the driven shaft and constantly meshing with the seventh gear on the countershaft, a one-way clutch connecting the gear cluster to the countershaft, means for selectively non-rotatably locking the third gear to said hub and for locking the hub to the first gear, and means for selectively locking the fifth and eighth gears to the driven shaft.

8. In a transmission, coaxial driving and driven shafts, a countershaft, a first gear on the driving shaft, a two gear cluster journaled on the countershaft and having one gear constantly meshing with the first gear on the driving shaft, a third gear on the driven shaft adapted to mesh with the other gear on said cluster, a fifth gear having a hub journaled on the driven shaft and said third gear being splined on the hub for selective engagement with the first gear on the driving shaft and the other gear of the cluster, sixth and seventh gears on the countershaft and the sixth gear being constantly meshed with the fifth, an eighth gear journaled on the driven shaft and constantly meshing with the seventh gear on the countershaft, a one-way clutch connecting the gear cluster to the countershaft, and a shuttle member non-rotatably slidable on the driven shaft and having means for engagement with the fifth and eighth gears for selectively locking the same to the driven shaft.

9. In a transmission, coaxial driving and driven shafts, a countershaft, a first gear on the driving shaft, a two gear cluster journaled on the countershaft and having one gear constantly meshing with the first gear on the driving shaft, a third gear on the driven shaft adapted to mesh with the other gear on said cluster, a fifth gear having a hub journaled on the driven shaft and said third gear being splined on the hub for selective engagement with the first gear on the driving shaft and the other gear of the cluster, sixth and seventh gears on the countershaft and the sixth gear being constantly meshed with the fifth, an eighth gear journaled on the driven shaft and constantly meshing with the seventh gear on the countershaft, a one-way clutch connecting the gear cluster to the countershaft, the fifth and eighth gears being spaced apart and having internal teeth on their facing sides, and a shuttle splined on the driven shaft between these gears and having teeth for engaging said internal teeth to selectively lock the fifth and eighth gears to rotate with the driven shaft.

10. In a transmission, coaxial driving and driven shafts, a countershaft, a first gear on the driving shaft, a two gear cluster journaled on the countershaft and having one gear constantly meshing with the first gear on the driving shaft, a third gear on the driven shaft adapted to mesh with the other gear on said cluster, a fifth gear having a hub journaled on the driven shaft and said third gear being splined on the hub for selective engagement with the first gear on the driving shaft and the other gear of the cluster, sixth and seventh gears on the countershaft and the sixth gear being constantly meshed with the fifth, an eighth gear journaled on the driven shaft and constantly meshing with the seventh gear on the countershaft, a one-way clutch connecting the gear cluster to the countershaft, externally gear toothed shifting means for selectively locking the fifth and eighth gears to the driven shaft, a reverse idler gear positionable in mesh with the seventh gear and with said shifting means, and means slidably but non-rotatably mounting the shifting means to the driven shaft.

11. In a transmission, coaxial driving and driven shafts, a countershaft, a first gear on the driving shaft, a two gear cluster journaled on the countershaft and having one gear constantly meshing with the first gear on the driving shaft, a third gear on the driven shaft adapted to mesh with the other gear on said cluster, a fifth gear having a hub journaled on the driven shaft and said third gear being splined on the hub for selective engagement with the first gear on the driving shaft and the other gear of the cluster, sixth and seventh gears on the countershaft and the sixth gear being constantly meshed with the fifth, an eighth gear journaled on the driven shaft and constantly meshing with the seventh gear on the countershaft, a one-way clutch connecting the gear cluster to the countershaft, an externally toothed shifting member splined on the driven shaft and having means for selectively locking the fifth and eighth gears to rotate with that shaft, and a reverse idler gear and means supporting the same for meshing engagement with the shifting member and selective meshing engagement with the seventh gear.

12. In a transmission, coaxial driving and driven shafts, a countershaft, a first gear on the driving shaft, a two gear cluster journaled on the countershaft and having one gear constantly meshing with the first gear on the driving shaft, a third gear on the driven shaft adapted to mesh with the other gear on said cluster, a fifth gear having a hub journaled on the driven shaft, the third gear being splined on the hub for shifting into and out of engagement with the other of the gears of said cluster, the splines being of the same diameter and shape as the teeth on the first gear whereby the third gear may also be shifted thereunto to lock the driving shaft and fifth gear together, a one-way clutch connecting the gear cluster to the countershaft, and additional selectively operative gears for transmitting torque from the countershaft and gear cluster to the driven shaft.

13. In a transmission, coaxial driving and driven shafts, a countershaft, a countershaft gear cluster and overrunning clutch mounting the same on the countershaft, a first gear on the driving shaft, a second gear forming part of the gear cluster and constantly meshed with the first gear, a third gear, a fourth gear also forming part of the gear cluster, a fifth gear loose on the driven shaft and having a splined hub, said third gear being rotatable on said hub, a first clutch member shiftable on the splines of the hub and having means for selective dental engagement with the first and fifth gears, sixth and seventh gears rigid with the countershaft and said sixth gear being constantly meshed with the fifth gear, an eighth gear loose on the driven shaft and constantly meshed with the seventh gear, and a second clutch member operative to selectively connect the fifth and eighth gears to rotate with the driven shaft.

WILLIAM E. SWENSON.

References Cited in the file of this patent

UNITED STATES PATENTS

| Number | Name | Date |
|---|---|---|
| 1,446,326 | Asprooth | Feb. 20, 1923 |
| 1,506,400 | Wynne | Aug. 26, 1924 |
| 2,085,322 | Lapsley | June 29, 1937 |
| 2,227,742 | Backus | Jan. 7, 1941 |
| 2,237,297 | Banker | Apr. 8, 1941 |
| 2,329,354 | McCarter | Sept. 14, 1943 |